US012417201B2

(12) United States Patent
Sato

(10) Patent No.: US 12,417,201 B2
(45) Date of Patent: Sep. 16, 2025

(54) INFORMATION PROCESSING DEVICE, SIGNAL CORRECTION METHOD, AND COMPUTER-READABLE RECORDING MEDIUM STORING SIGNAL CORRECTION PROGRAM

(71) Applicant: Fsas Technologies Inc., Kawasaki (JP)

(72) Inventor: Hiroki Sato, Yokohama (JP)

(73) Assignee: Fsas Technologies Inc., Kawasaki (JP)

( * ) Notice: Subject to any disclaimer, the term of this patent is extended or adjusted under 35 U.S.C. 154(b) by 0 days.

(21) Appl. No.: 18/334,477

(22) Filed: Jun. 14, 2023

(65) Prior Publication Data

US 2024/0037051 A1 Feb. 1, 2024

(30) Foreign Application Priority Data

Jul. 29, 2022 (JP) ................... 2022-121093

(51) Int. Cl.
*G06F 13/38* (2006.01)
*G06F 13/42* (2006.01)

(52) U.S. Cl.
CPC ................... *G06F 13/38* (2013.01)

(58) Field of Classification Search
CPC ............. H04N 1/00888; H04N 1/52
See application file for complete search history.

(56) References Cited

U.S. PATENT DOCUMENTS

| | | | |
|---|---|---|---|
| 2006/0161714 A1 | 7/2006 | Satoshi | |
| 2010/0094928 A1* | 4/2010 | Nakamura | H04L 67/125 709/203 |
| 2012/0021780 A1* | 1/2012 | Okuda | H04M 1/663 455/458 |
| 2013/0124737 A1* | 5/2013 | Tachibana | H04L 12/00 709/227 |
| 2016/0165084 A1* | 6/2016 | Ozawa | H04N 1/00888 358/1.13 |
| 2018/0359173 A1* | 12/2018 | Tomita | H04L 45/02 |
| 2019/0005627 A1* | 1/2019 | Nanaumi | G06T 7/75 |
| 2022/0191661 A1* | 6/2022 | Imai | H04L 45/12 |

FOREIGN PATENT DOCUMENTS

| | | |
|---|---|---|
| JP | 2006-201881 A | 8/2006 |
| JP | 2009-282798 A | 12/2009 |

* cited by examiner

Primary Examiner — Getente A Yimer
(74) Attorney, Agent, or Firm — ArentFox Schiff LLP

(57) ABSTRACT

An information processing device includes a connection circuit to which a device is coupled, an arithmetic processing circuit communicating with the device coupled to the connection circuit through a first communication path, a correction circuit that corrects a signal in the first communication path, and a control circuit. The control circuit receives, from the device, a connection signal indicating that the device is coupled to the connection circuit through a second communication path when the device is coupled to the connection circuit, obtains, from the device, identification information that indicates the device through a third communication path based on the connection signal, updates first correction information to be used to correct the signal to second correction information based on the identification information, and transmits, to the arithmetic processing circuit, an update completion signal through a fourth communication path after the first correction information is updated to the second correction information.

12 Claims, 19 Drawing Sheets

FIG. 5

| PORT NUMBER | CORRECTION PARAMETER |
|---|---|
| 0 | 00 ··· ff |
| ··· | ··· |
| x | 00 ··· ff |

FIG. 6

| SLOT NUMBER | VENDOR INFORMATION | TYPE INFORMATION |
|---|---|---|
| 0 | 0x10CF | 0x01ef |

FIG. 7

| SLOT NUMBER | VENDOR INFORMATION | TYPE INFORMATION | PORT NUMBER | CORRECTION PARAMETER | UPDATE COMMAND |
|---|---|---|---|---|---|
| 0 | 0x10CF | 0x01ef | 0-3 | 00 00 00 00 ⋯ | Write : xx xx xx<br>Write : xx xx xx |
| ⋯ | ⋯ | ⋯ | ⋯ | ⋯ | ⋯ |
| xx | Other | Other | Other | FF FF FF FF ⋯ | Write : xx xx xx<br>Write : xx xx xx |

FIG. 8

| Symbol | DESCRIPTION |
|---|---|
| Atnled_ | OUTPUT OF ATTENTION LED INDICATOR |
| Pwrled | OUTPUT OF POWER LED INDICATOR |
| pwren_n | OUTPUT OF POWER ENABLE SIGNAL |
| button_n | INPUT OF BUTTON SIGNAL |
| prsnt_n | INPUT OF DEVICE PRESENT SIGNAL |
| pwrflt_n | INPUT OF POWER FAULT SIGNAL |
| mrl_n | INPUT OF MECHANICAL LATCH SIGNAL |
| Emil | OUTPUT OF LATCH SWITCH SIGNAL |

INFORMATION PROCESSING DEVICE, SIGNAL CORRECTION METHOD, AND COMPUTER-READABLE RECORDING MEDIUM STORING SIGNAL CORRECTION PROGRAM

CROSS-REFERENCE TO RELATED APPLICATION

This application is based upon and claims the benefit of priority of the prior Japanese Patent Application No. 2022-121093, filed on Jul. 29, 2022, the entire contents of which are incorporated herein by reference.

FIELD

The embodiment discussed herein is related to a signal correction technique.

BACKGROUND

With development of software technology, there are increasing cases of constructing a calculation system having high performance and high availability by coupling a large number of servers via a communication network.

In a case of constructing such a calculation system, it is preferable to keep the unit price and the installation area per server lower while securing the processing performance of each server to some extent. Moreover, in order to construct the calculation system on the communication network, each server may preferably be equipped with a plurality of input/output (I/O) cards of different types.

In relation to the I/O card, there has been known a technique of extending a transmission distance of a Peripheral Component Interconnect (PCI) Express interface. There has also been known an information processing device that takes an appropriate measure when the number of lanes of the PCI Express interface is reduced.

Japanese Laid-open Patent Publication No. 2009-282798 and Japanese Laid-open Patent Publication No. 2006-201881 are disclosed as related art.

SUMMARY

According to an aspect of the embodiments, an information processing device including: a connection circuit to which a device is coupled; an arithmetic processing circuit that communicates with the device coupled to the connection circuit through a first communication path; a correction circuit that corrects a signal in the first communication path; and a control circuit that receives, from the device, a connection signal that indicates that the device is coupled to the connection circuit through a second communication path when the device is coupled to the connection circuit, obtains, from the device, identification information that indicates the device through a third communication path based on the connection signal, updates first correction information to be used to correct the signal to second correction information based on the identification information, and transmits, to the arithmetic processing circuit, an update completion signal through a fourth communication path after the first correction information is updated to the second correction information, wherein the first communication path includes a communication path between the connection circuit and the arithmetic processing circuit, the second communication path includes a communication path between the connection circuit and the control circuit, the third communication path includes a communication path between the connection circuit and the control circuit, and the fourth communication path includes a communication path between the control circuit and the arithmetic processing circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating signal correction data;
FIG. 6 is a diagram illustrating device information;
FIG. 7 is a diagram illustrating setting information;
FIG. 8 is a diagram illustrating a sideband signal.

DESCRIPTION OF EMBODIMENTS

In the server described above, a plurality of types of I/O cards may preferably be mounted so that various customer requests may be handled. Thus, a connection unit for mounting a detachable I/O card is provided.

In this case, a communication path for high-speed communication is commonly provided between the connection unit and a central processing unit (CPU). The CPU may be called a processor at times. For example, Peripheral Component Interconnect Express (PCIe) has been known as a communication standard of high-speed communication.

A higher communication speed between the CPU and the I/O card is more preferable. In view of the above, in order to improve the communication speed, a scheme in which signal amplitude is smaller and a signal frequency is higher tends to be selected in the communication standard. When the amplitude is made smaller and the frequency is made higher, the influence of noise, which does not raise a problem in a low-speed communication standard, increases, and signal distortion occurs due to signal attenuation, interference from another circuit, or physical characteristics of a motherboard.

In common communication standards as well, signal distortion in high-speed communication is taken into consideration. For example, in the PCIe standard, an attempt is made to improve a signal waveform by correcting signals at a time of signal transmission and at a time of signal reception.

For example, a transmission-side circuit makes correction for emphasizing the rising part and the falling part of the signal, which makes it possible to bring the signal received by a reception-side circuit close to a rectangular wave. A plurality of correction parameters for the rising part and the falling part is prepared in advance, and any of the correction parameters is selected and used for signal correction.

However, in a case where an I/O card different from the I/O card that has been coupled to the connection unit of the server is coupled to the connection unit, signal distortion in the communication path for high-speed communication may not be appropriately corrected with the correction parameters prepared in advance. This makes it difficult to use the different I/O card that has been coupled.

Note that such a problem occurs not only in a case where the I/O card is coupled to the server but also in a case where various devices are coupled to the information processing device. Furthermore, such a problem occurs not only in a case where the CPU and the I/O card communicate with each other but also in a case where various arithmetic processing units in the information processing device and the devices communicate with each other.

In one aspect, an object of the embodiment is, even when a different device is coupled to an information processing device, to enable communication between an arithmetic processing unit and the coupled device.

Hereinafter, an embodiment will be described in detail with reference to the drawings.

Figure 1:
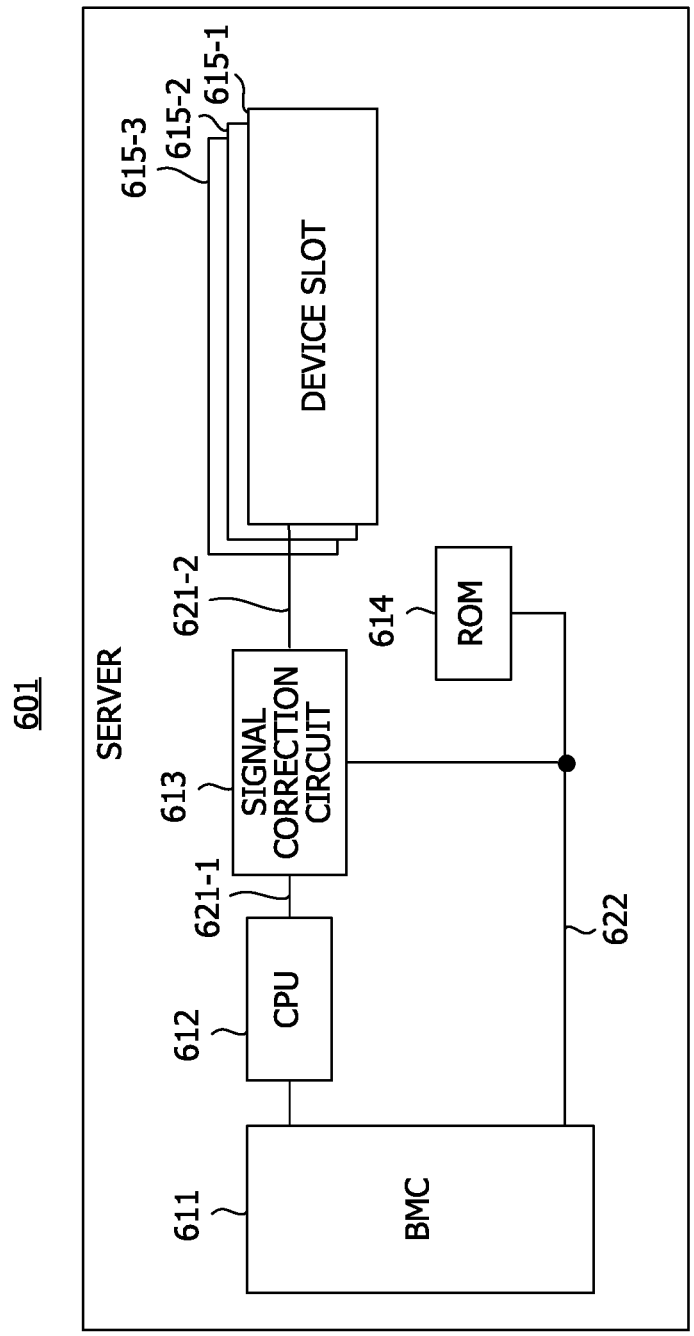
FIG. 1 is a configuration diagram of a server according to a comparative example.

FIG. 1 illustrates an exemplary configuration of a server according to a comparative example. A server 601 in FIG. 1 includes a baseboard management controller (BMC) 611, a CPU 612, a signal correction circuit 613, a read only memory (ROM) 614, and device slots 615-1 to 615-3.

The BMC 611 manages the server 601. The device slots 615-*i* (i=1 to 3) correspond to a connection unit, and a detachable device such as an I/O card is coupled to the device slots 615-*i*. The ROM 614 stores correction parameters for devices coupled to the device slots 615-*i* in association with the individual device slots 615-*i*. Throughout this specification, the term "unit" is used as a synonym of a "circuit block".

The CPU 612 communicates with the devices coupled to the individual device slots 615-*i* through a communication path 621-1 and a communication path 621-2 for high-speed communication. The communication path 621-1 and the communication path 621-2 represent communication paths to each of the device slots 615-1 to 615-3. (In FIG. 1, a connection between the communication path 621-2 and the slot 615-1 is illustrated, and connections between the communication path 621-2 and other slots 615-2 and 615-3 are omitted to be illustrated.)

The signal correction circuit 613 is provided between the communication path 621-1 and the communication path 621-2, and corrects signals transmitted and received between the CPU 612 and the individual devices using the correction parameters stored in the ROM 614.

When the main power supply of the server 601 is turned on, the CPU 612 checks sideband signals transmitted from the individual devices. The sideband signals include information indicating a device mounting status and a light emitting diode (LED) status.

When it is determined that a device is mounted based on the sideband signal, the CPU 612 carries out incorporation of the device. In the device incorporation, the device is subject to initialization of high-speed communication. When the initialization of high-speed communication is complete, the CPU 612 checks whether or not link-up of the device is successful.

When the link-up is successful, the CPU 612 obtains vendor information and type information from the device through the communication path 621-1 and the communication path 621-2. Then, the CPU 612 checks whether or not the correction parameters associated with the individual device slots 615-*i* in the ROM 614 correspond to the vendor information and the type information of the devices coupled to the device slots 615-*i*.

When the correction parameter associated with the device slot 615-*i* does not correspond to the vendor information and the type information of the device coupled to the device slot 615-*i*, the CPU 612 instructs the BMC 611 to rewrite the ROM 614.

The BMC 611 rewrites the ROM 614 through a communication path 622 for low-speed communication in accordance with the instruction from the CPU 612. As a result, the correction parameters associated with the individual device slots 615-*i* in the ROM 614 are updated to correction parameters corresponding to the vendor information and the type information of the devices coupled to the device slots 615-*i*.

Next, the BMC 611 restarts the server 601. At the time of the restart, the correction parameters associated with the individual device slots 615-*i* in the ROM 614 correspond to the vendor information and the type information of the devices coupled to the device slots 615-*i*. The signal correction circuit 613 obtains the correction parameters for the individual devices from the ROM 614 through the communication path 622.

The CPU 612 transmits signals directed to the individual devices to the signal correction circuit 613. The signal correction circuit 613 corrects the signals received from the CPU 612 using the correction parameters for the individual devices, thereby generating correction signals. Then, the signal correction circuit 613 transmits the correction signals to the individual devices.

The individual devices transmit signals directed to the CPU 612 to the signal correction circuit 613. The signal correction circuit 613 corrects the signals received from the individual devices using the correction parameters for the individual devices, thereby generating correction signals. Then, the signal correction circuit 613 transmits the correction signals to the CPU 612.

However, when a new device that appears after the release of the server 601 is coupled to the device slot 615-*i*, a compatibility problem may occur between the server 601 and the new device, and link-up may fail. When the link-up fails, the CPU 612 is not notified of the vendor information and the type information of the new device, whereby the ROM 614 is not rewritten and the correction parameters in the ROM 614 are not updated.

When the correction parameters in the ROM 614 are not updated, signal correction using the correction parameter for the new device is not carried out in the signal correction circuit 613, whereby it is difficult to use the new device.

Figure 2:
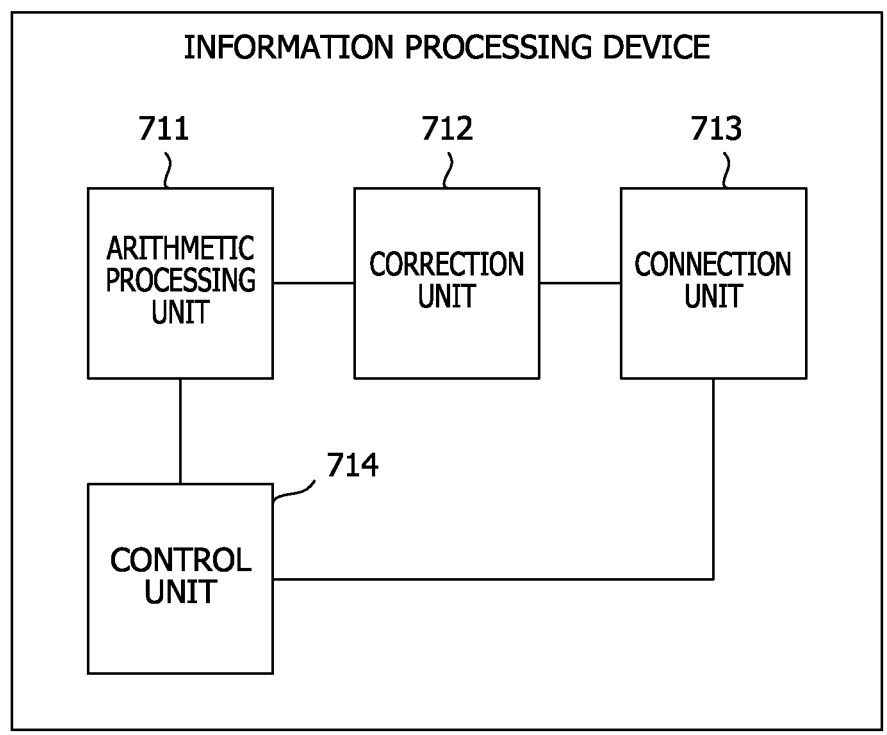
FIG. 2 is a functional configuration diagram of an information processing device according to an embodiment.

FIG. 2 illustrates an exemplary functional configuration of an information processing device according to the embodiment. An information processing device 701 in FIG. 2 includes an arithmetic processing unit 711, a correction unit 712, a connection unit 713, and a control unit 714. The arithmetic processing unit 711 communicates with a device coupled to the connection unit 713 through a first communication path. The correction unit 712 corrects signals in the first communication path.

Figure 3:
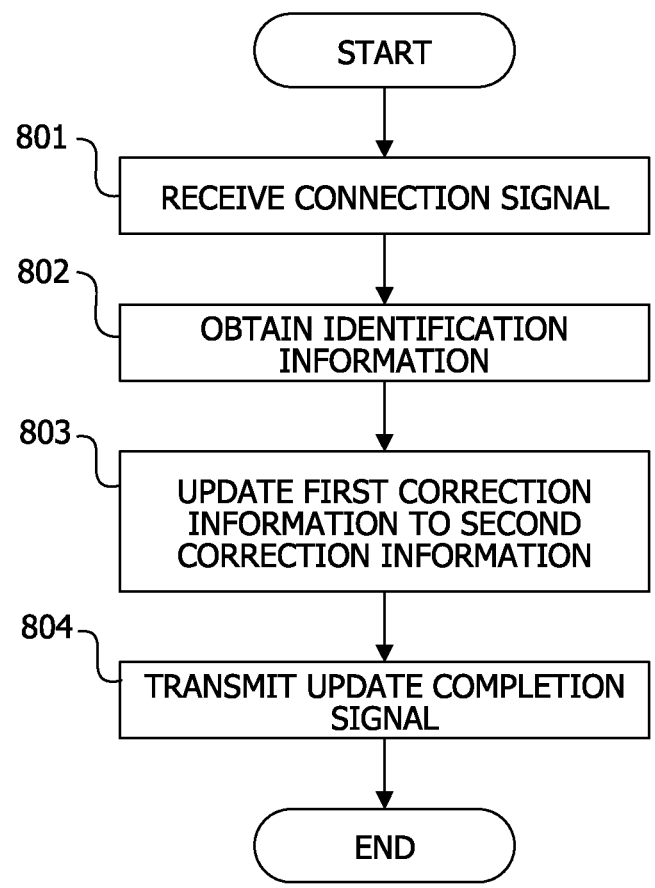
FIG. 3 is a flowchart of a signal correction process.

FIG. 3 is a flowchart illustrating an exemplary signal correction process to be performed by the information processing device 701 in FIG. 2. First, when a device is coupled to the connection unit 713, the control unit 714 receives, from the device, a connection signal indicating that the device is coupled to the connection unit 713 through a second communication path (step 801). Then, the control unit 714 obtains, from the device, identification information indicating the device through a third communication path based on the connection signal (step 802).

Next, the control unit 714 updates first correction information for signal correction to second correction information based on the identification information (step 803), and transmits an update completion signal to the arithmetic processing unit 711 through a fourth communication path (step 804).

The first communication path is a communication path between the connection unit 713 and the arithmetic processing unit 711, the second communication path is a communication path between the connection unit 713 and the control unit 714, the third communication path is a communication path between the connection unit 713 and the control unit 714, and the fourth communication path is a communication path between the control unit 714 and the arithmetic processing unit 711.

According to the information processing device 701 in FIG. 2, even in a case where a different device is coupled to the information processing device 701, it becomes possible to perform communication between the arithmetic processing unit 711 and the coupled device.

Figure 4:
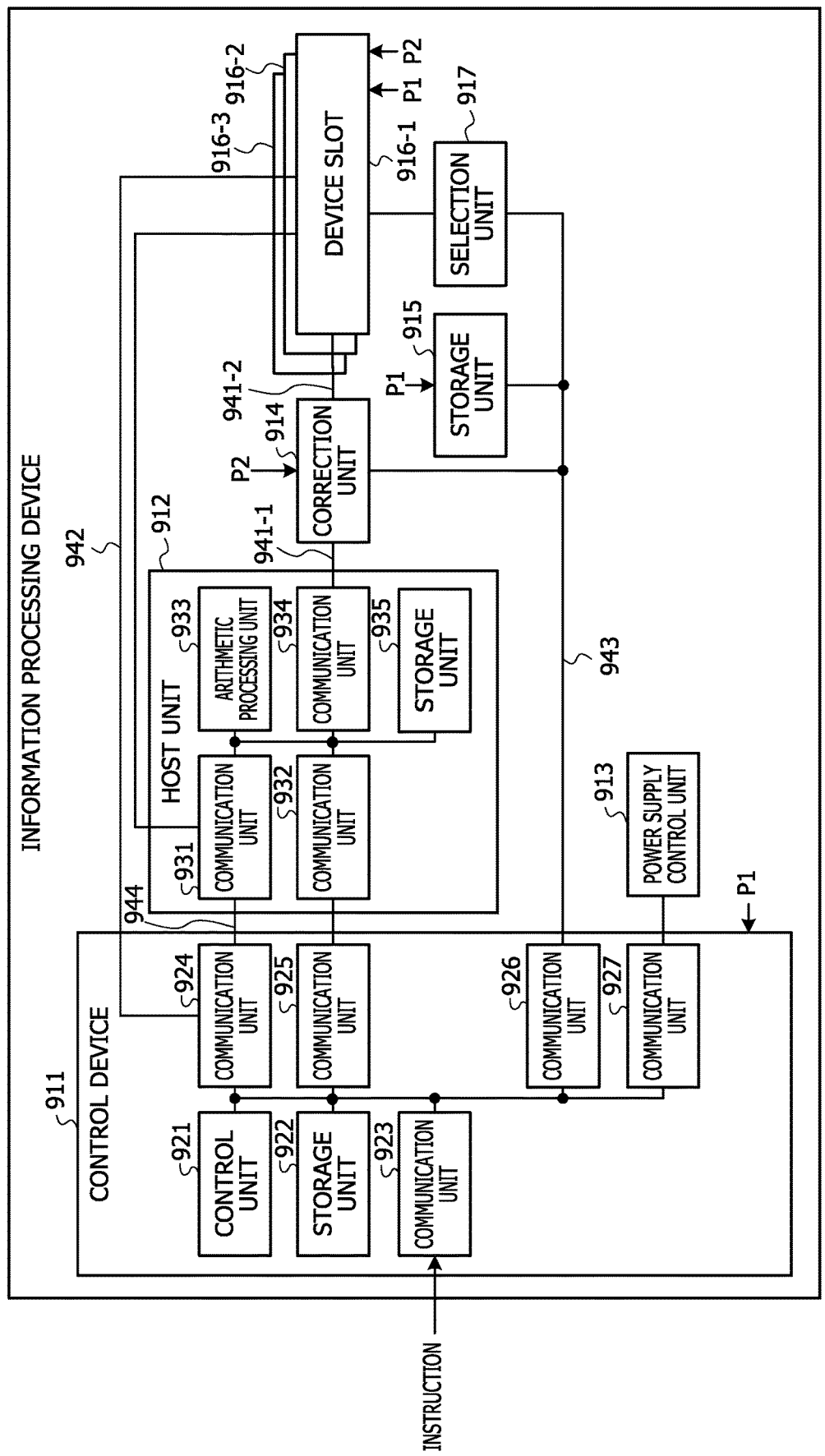
FIG. 4 is a functional configuration diagram illustrating a specific example of the information processing device.

FIG. 4 illustrates a specific example of the information processing device 701 in FIG. 2. An information processing device 901 in FIG. 4 is, for example, a server, and includes a control device 911, a host unit 912, a power supply control unit 913, a correction unit 914, a storage unit 915, device slots 916-1 to 916-3, and a selection unit 917.

The control device 911 includes a control unit 921, a storage unit 922, and communication units 923 to 927. The host unit 912 includes a communication unit 931, a communication unit 932, an arithmetic processing unit 933, a communication unit 934, and a storage unit 935.

The arithmetic processing unit 933, the correction unit 914, the device slots 916-i (i=1 to 3), and the control unit 921 correspond to the arithmetic processing unit 711, the correction unit 712, the connection unit 713, and the control unit 714 in FIG. 2, respectively. The number of the device slots 916-i is not limited to three, and may be N (N is an integer of 1 or more).

A detachable device such as an I/O card is coupled to the device slot 916-i. The device to be coupled to the device slot 916-i may be a network interface card (NIC), a graphics processing unit (GPU), or a solid state drive (SSD).

The control device 911 and the storage unit 915 operate by permanent power supply P1, and the host unit 912 operates by normal power supply P2. A device coupled to the device slot 916-i operates by the permanent power supply P1 and the normal power supply P2. When an alternating current (AC) cable is coupled to the information processing device 901, power of the permanent power supply P1 is supplied.

The power supply control unit 913 switches ON and OFF of the normal power supply P2 in accordance with an instruction from the control device 911. Power of the normal power supply P2 is supplied when the normal power supply P2 is ON, and the power supply of the normal power supply P2 stops when the normal power supply P2 is OFF.

The storage unit 915 stores signal correction data. The signal correction data includes correction parameters associated with the individual device slots 916-i. The correction parameters associated with the individual device slots 916-i indicate correction parameters to be applied to devices coupled to the individual device slots 916-i. The storage unit 915 is an exemplary correction information storage unit, and the correction parameters are exemplary correction information.

FIG. 5 illustrates an example of the signal correction data stored in the storage unit 915. The signal correction data in FIG. 5 includes a port number and a correction parameter. The port number and the correction parameter are associated with each other.

The port number is identification information indicating a port for high-speed communication between the host unit 912 and the devices coupled to the individual device slots 916-i. In the high-speed communication, a plurality of ports is used in the high-speed communication between the host unit 912 and each device. The correction parameter is associated with the device slot 916-i to which the device using the port indicated by the port number is coupled via the port number.

Returning to FIG. 4, the host unit 912 communicates with the devices coupled to the individual device slots 916-i through a communication path 941-1 and a communication path 941-2 for high-speed communication. The communication path 941-1 and the communication path 941-2 represent communication paths to each of the device slots 916-1 to 916-3.

The correction unit 914 is provided between the communication path 941-1 and the communication path 941-2, and corrects signals transmitted and received between the host unit 912 and the individual devices using the correction parameters stored in the storage unit 915. The communication path 941-1 and the communication path 941-2 correspond to the first communication path. (In FIG. 4, connections between the communication paths 941-2, 942, etc. and the slot 916-1 are illustrated, and connections between those communication paths and other slots 916-2 and 916-3 are omitted to be illustrated.)

The selection unit 917 selects any of the device slots 916-i in accordance with an instruction from the control device 911. Then, it transfers the vendor information and the type information output from the device coupled to the selected device slot 916-i to the control device 911. The vendor information is identification information indicating a vendor of the device, and the type information is identification information indicating the device.

The arithmetic processing unit 933 of the host unit 912 performs various types of information processing using the storage unit 935. The arithmetic processing unit 933 transmits, to the communication path 941-1, signals directed to the device coupled to the device slot 916-i via the communication unit 934, and receives signals transmitted from the device from the communication path 941-1. The arithmetic processing unit 933 communicates with the control device 911 via the communication unit 932.

The control unit 921 of the control device 911 performs processing of managing the information processing device 901 using the storage unit 922. The control unit 921 receives an instruction from a user via the communication unit 923. The instruction from the user is, for example, an instruction for switching ON and OFF of the normal power supply P2, which is input to the information processing device 901 via a web user interface (UI), for example. The control unit 921 communicates with the host unit 912 via the communication unit 925.

The control device 911 communicates with the correction unit 914, the storage unit 915, and the selection unit 917 through a communication path 943 for low-speed communication. In the low-speed communication, the control unit 921 communicates with the correction unit 914, the storage unit 915, and the selection unit 917 via the communication unit 926. The communication path 943 corresponds to the third communication path. The control unit 921 communicates with the power supply control unit 913 via the communication unit 927.

The device coupled to the device slot 916-*i* initializes the communication function for low-speed communication when the power of the permanent power supply P1 is supplied. This enables low-speed communication between the device and the control device 911 through the communication path 943.

When the power of the normal power supply P2 is supplied, the device starts to stand by for initialization of high-speed communication by the host unit 912. When the initialization of high-speed communication is carried out, high-speed communication between the device and the host unit 912 becomes available through the communication path 941-1 and the communication path 941-2.

The storage unit 922 stores power supply information, device information, and setting information. The power supply information indicates whether the normal power supply P2 is ON or OFF. The device information includes the vendor information and the type information obtained from the devices coupled to the individual device slots 916-*i*. The setting information includes the correction parameters for the individual devices, and is set by the user in advance. The storage unit 922 is an exemplary correspondence relationship storage unit.

FIG. 6 illustrates an example of the device information stored in the storage unit 922. The device information in FIG. 6 includes a slot number, vendor information, and type information. The slot number, the vendor information, and the type information are associated with each other. The slot number is identification information indicating the device slot 916-*i* to which the device is coupled.

FIG. 7 illustrates an example of the setting information stored in the storage unit 922. The setting information in FIG. 7 includes a slot number, vendor information, type information, a port number, a correction parameter, and an update command. The slot number, the vendor information, the type information, the port number, the correction parameter, and the update command are associated with each other.

Each slot number is associated with a plurality of port numbers. Those port numbers indicate a plurality of ports to be used in the high-speed communication with the device coupled to the device slot 916-*i* indicated by the slot number.

The correction parameter represents a correction parameter to be applied to the device indicated by the vendor information and the type information when the device is coupled to the device slot 916-*i* indicated by the slot number. The update command represents a command to be used when the control device 911 directly updates the correction parameter set in the correction unit 914. The update command includes each port number corresponding to the slot number and the correction parameter to be applied to the device.

"Other" in the vendor information, the type information, and the port number indicates one or a plurality of general-purpose devices, and the vendor information, the type information, and the port number other than that indicates a specific device. A specific device is, for example, a device to be subject to extreme signal correction.

In the signal correction data stored in the storage unit 915, a correction parameter associated with each port number is any of the correction parameters included in the setting information.

The devices coupled to the individual device slots 916-*i* transmit sideband signals directed to the host unit 912 to the control device 911 through a communication path 942, and the control unit 921 receives the sideband signals from the devices via a communication unit 924. The communication path 942 corresponds to the second communication path.

The control unit 921 transmits the received sideband signals to the host unit 912 via the communication unit 924 and a communication path 944, and the arithmetic processing unit 933 receives the sideband signals from the control device 911 via the communication unit 931. The communication path 944 corresponds to the fourth communication path. The arithmetic processing unit 933 transmits, to the device, the sideband signal directed to the device via the communication unit 931.

FIG. 8 illustrates an example of the sideband signal in high-speed communication based on PCIe. The sideband signal in FIG. 8 include Atnled_, Pwrled, pwren_n, button_n, prsnt_n, pwrflt_n, mrl_n, and Emil. Atnled_, Pwrled, pwren_n, and Emil are information to be notified from the host unit 912 to the device, and button_n, prsnt_n, pwrflt_n, and mrl_n are information to be notified from the device to the host unit 912.

Among the pieces of information to be notified from the device to the host unit 912, prsnt_n is a negative logic device present signal, and indicates whether or not the device is coupled to the corresponding device slot 916-*i*. When the device is coupled to the device slot 916-*i*, prsnt_n is Low, and when no device is coupled to the device slot 916-*i*, prsnt_n is High. The Low status of prsnt_n corresponds to the connection signal indicating that the device is coupled to the connection unit.

Hereinafter, a state in which a device is coupled to the device slot 916-*i* may be referred to as a device mounted state, and a state in which no device is coupled to the device slot 916-*i* may be referred to as a device non-mounted state.

When the sideband signal received from the device changes from the device mounted state to the device non-mounted state, the control unit 921 of the control device 911 obtains the vendor information and the type information from the device via the communication unit 926. Then, the control unit 921 stores, in the storage unit 922, the device information including the slot number corresponding to the sideband signal and the obtained vendor information and type information.

Next, the control unit 921 obtains, from the setting information stored in the storage unit 922, the port number, the correction parameter, and the update command corresponding to the slot number, the vendor information, and the type information included in the device information.

Next, the control unit 921 refers to the power supply information stored in the storage unit 922 to check whether the normal power supply P2 is ON or OFF. In a case where the normal power supply P2 is OFF and the power is not supplied to the correction unit 914, the control unit 921 updates the correction parameters in the storage unit 915 via the communication unit 926. At this time, the control unit 921 updates the correction parameter associated with each port number obtained from the setting information in the storage unit 915 to the correction parameter obtained from the setting information.

In this case, the correction parameter associated with each port number in the storage unit 915 corresponds to the first correction information, and the correction parameter obtained from the setting information corresponds to the second correction information.

Thereafter, when the normal power supply P2 changes from OFF to ON and the power is supplied to the correction unit 914, the correction unit 914 obtains, from the storage unit 915, the correction parameter associated with each port number through the communication path 943.

After updating the correction parameter in the storage unit 915, the control unit 921 transmits the sideband signal received from the device to the host unit 912 via the communication unit 924 and the communication path 944. When the arithmetic processing unit 933 of the host unit 912 receives the sideband signal from the control device 911, it starts to communicate with the device that has transmitted the sideband signal via the communication unit 934. The sideband signal transmitted from the control device 911 to the host unit 912 corresponds to the update completion signal.

Since the sideband signal is transmitted to the host unit 912 after the correction parameter in the storage unit 915 is updated, the link-up does not start using the correction parameter before the update, which avoids link-up failure.

As an example, it is assumed that a device different from the device that has been coupled to the device slot 916-i is coupled to the device slot 916-i. In this case, since the storage unit 915 stores the correction parameter for the different device when the power is supplied to the correction unit 914, the correction unit 914 may obtain the correction parameter from the storage unit 915. As a result, appropriate signal correction is carried out using the correction parameter for the different device, whereby high-speed communication between the arithmetic processing unit 933 and the different device becomes available.

On the other hand, in a case where the normal power supply P2 is ON and the power is supplied to the correction unit 914, the control unit 921 updates the correction parameter in the storage unit 915 via the communication unit 926. At this time, the control unit 921 updates the correction parameter associated with each port number obtained from the setting information in the storage unit 915 to the correction parameter obtained from the setting information.

Moreover, the control unit 921 transmits the update command obtained from the setting information to the correction unit 914 via the communication unit 926. As a result, the control unit 921 updates the correction parameter set in association with each port number corresponding to the slot number in the device information in the correction unit 914 to the correction parameter included in the update command.

In this case, the correction parameter set in association with each port number in the correction unit 914 corresponds to the first correction information, and the correction parameter included in the update command corresponds to the second correction information.

After updating the correction parameter in the storage unit 915 and the correction parameter in the correction unit 914, the control unit 921 transmits the sideband signal received from the device to the host unit 912 via the communication unit 924. When the arithmetic processing unit 933 of the host unit 912 receives the sideband signal from the control device 911, it starts to communicate with the device that has transmitted the sideband signal via the communication unit 934.

Since the sideband signal is transmitted to the host unit 912 after the correction parameter in the correction unit 914 is updated, the link-up does not start using the correction parameter before the update, which avoids link-up failure.

As an example, in a case where a device different from the device that has been coupled to the device slot 916-i is coupled to the device slot 916-i, the correction parameter in the correction unit 914 is updated to the correction parameter for the different device. As a result, appropriate signal correction is carried out using the correction parameter for the different device, whereby high-speed communication between the arithmetic processing unit 933 and the different device becomes available.

According to the information processing device 901 in FIG. 4, it becomes possible to perform high-speed communication between the arithmetic processing unit 933 and a different device coupled to the device slot 916-i, whereby the different device may be used without a problem. Even if the different device is a new device that has appeared after the release of the information processing device 901, a similar effect may be obtained.

Even in a case of using a device to be subject to extreme signal correction, the correction parameter may be automatically set in the storage unit 915 and the correction unit 914 by setting the correction parameter for the device in the setting information in advance.

Figure 9:
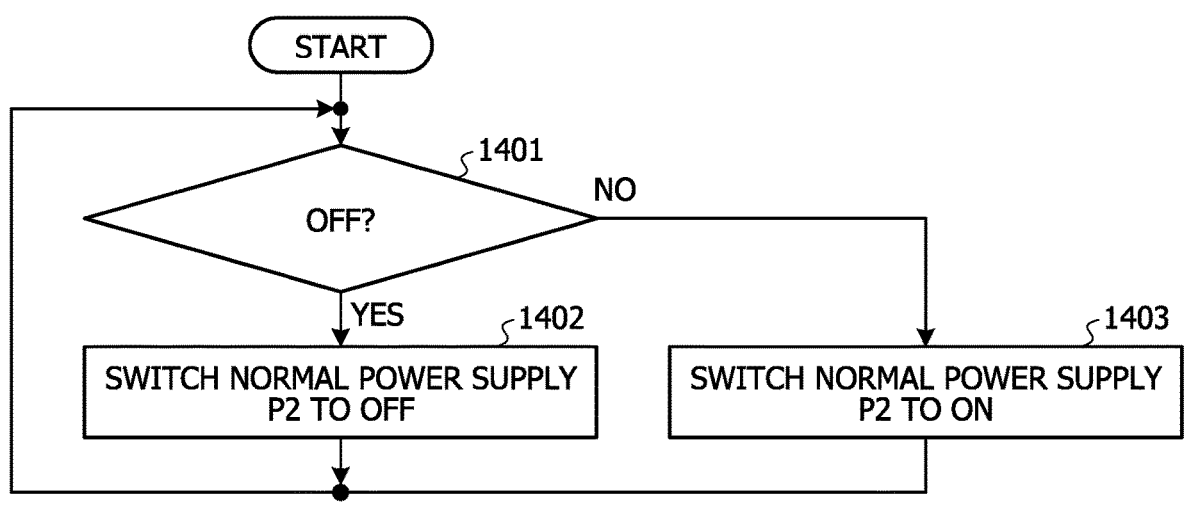
FIG. 9 is a flowchart of a power supply control process.

FIG. 9 is a flowchart illustrating an exemplary power supply control process to be performed by the power supply control unit 913 in FIG. 4. First, when the power supply control unit 913 receives a control signal from the control device 911, it checks the received control signal (step 1401).

If the control signal indicates OFF (YES in step 1401), the power supply control unit 913 switches the normal power supply P2 from ON to OFF (step 1402), and repeats the process of step 1401 and subsequent steps. On the other hand, if the control signal indicates ON (NO in step 1401), the power supply control unit 913 switches the normal power supply P2 from OFF to ON (step 1403), and repeats the process of step 1401 and subsequent steps.

Figure 10:
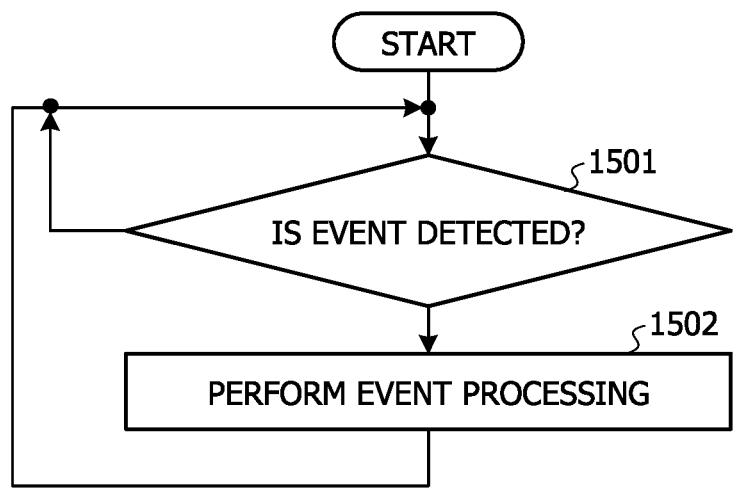
FIG. 10 is a flowchart of a control process.

FIG. 10 is a flowchart illustrating an exemplary control process to be performed by the control unit 921 in FIG. 4. First, the control unit 921 checks whether or not an event has been detected (step 1501).

If an event has been detected (YES in step 1501), the control unit 921 performs event processing corresponding to the detected event (step 1502), and repeats the process of step 1501 and subsequent steps. On the other hand, if no event has been detected (NO in step 1501), the control unit 921 repeats the process of step 1501 and subsequent steps.

Figure 11:
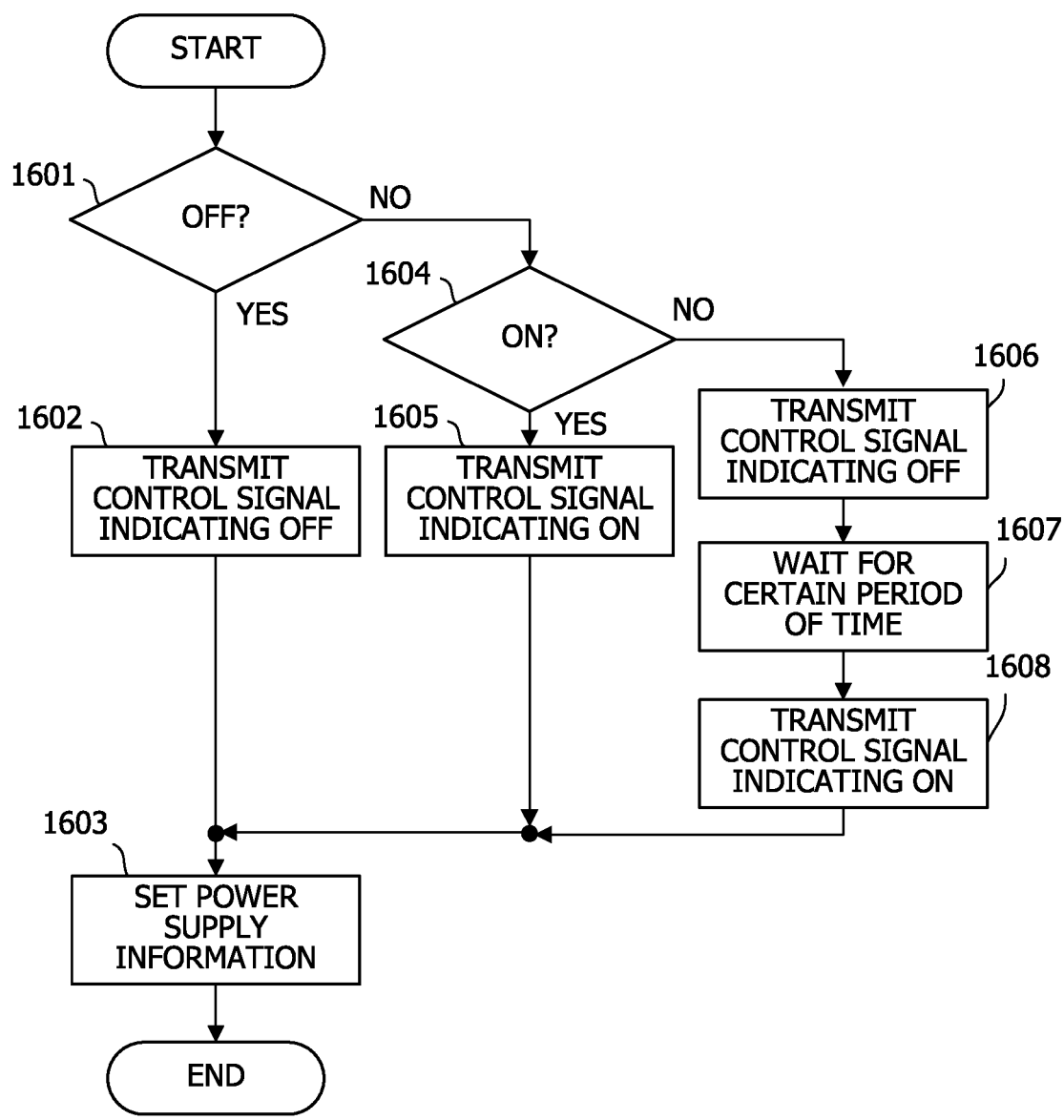
FIG. 11 is a flowchart of a first event process.

FIG. 11 is a flowchart illustrating exemplary first event processing to be performed in step 1502 when the event detected in step 1501 in FIG. 10 is reception of a power supply control instruction. The control device 911 receives a power supply control instruction for the normal power supply P2 from the host unit 912 or the user. The power supply control instruction indicates OFF, ON, or a power cycle. The power cycle corresponds to a restart.

First, the control unit 921 checks whether or not the received power supply control instruction indicates OFF (step 1601). If the power supply control instruction indicates OFF (YES in step 1601), the control unit 921 transmits a control signal indicating OFF to the power supply control unit 913 via the communication unit 927 (step 1602). Then, the control unit 921 sets the power supply information stored in the storage unit 922 to OFF (step 1603).

On the other hand, if the power supply control instruction indicates ON or the power cycle (NO in step 1601), the control unit 921 checks whether or not the power supply control instruction indicates ON (step 1604). If the power supply control instruction indicates ON (YES in step 1604), the control unit 921 transmits a control signal indicating ON to the power supply control unit 913 via the communication unit 927 (step 1605). Then, the control unit 921 sets the power supply information stored in the storage unit 922 to ON (step 1603).

On the other hand, if the power supply control instruction indicates the power cycle (NO in step 1604), the control unit 921 transmits a control signal indicating OFF to the power supply control unit 913 via the communication unit 927 (step 1606). Next, after waiting for a certain period of time (step 1607), the control unit 921 transmits a control signal indicating ON to the power supply control unit 913 (step 1608). Then, the control unit 921 sets the power supply information stored in the storage unit 922 to ON (step 1603).

Figure 12:
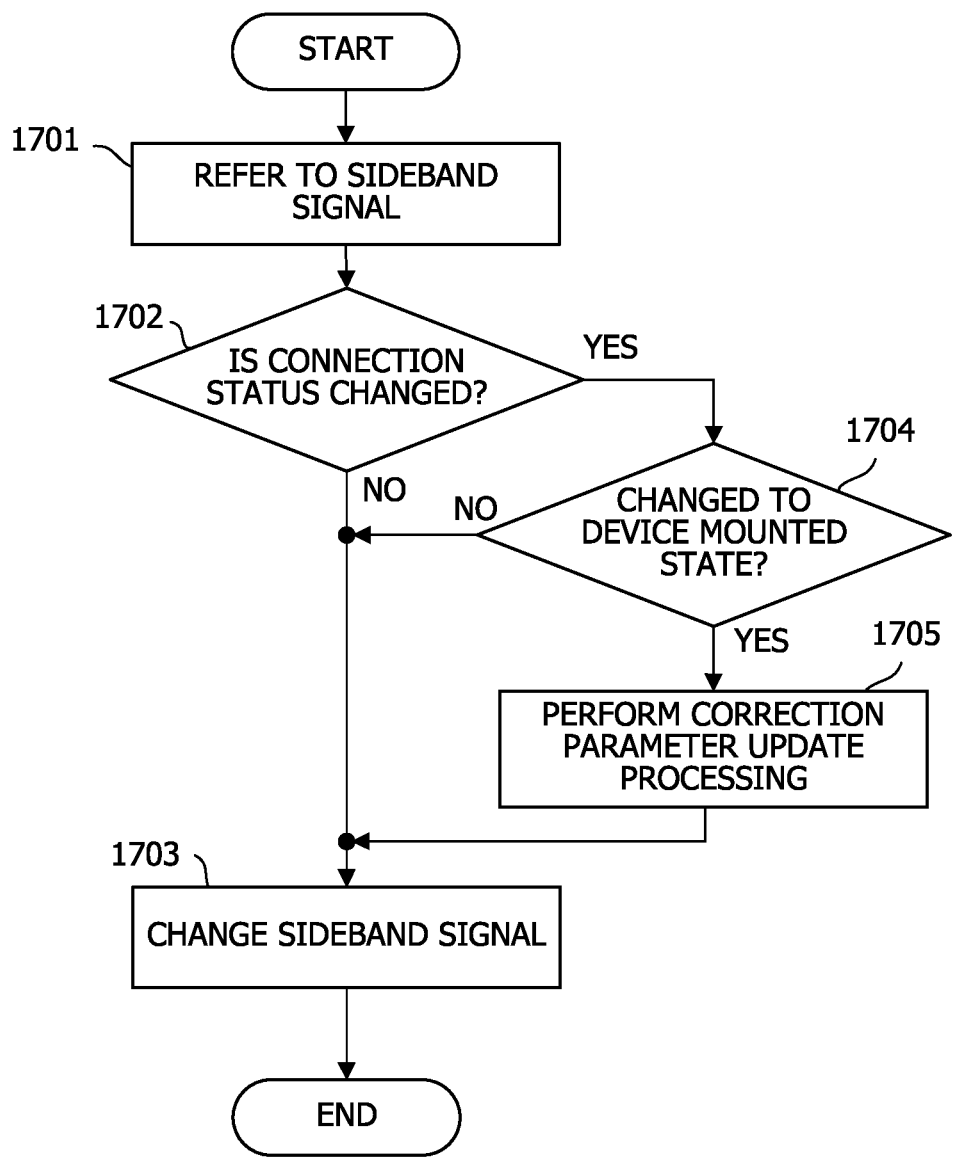
FIG. 12 is a flowchart of a second event process.

FIG. 12 is a flowchart illustrating exemplary second event processing to be performed in step 1502 when the event detected in step 1501 in FIG. 10 is a change of a sideband signal. The control device 911 monitors the sideband signal for each of the device slots 916-*i*, and performs the event processing of FIG. 12 when the sideband signal has changed from the sideband signal at the time of initial reception.

First, the control unit 921 refers to the received sideband signal (step 1701), and checks whether or not the device connection status in the device slot 916-*i* has changed (step 1702).

If the device connection status has not changed (NO in step 1702), the control unit 921 changes the sideband signal being output to the host unit 912 via the communication unit 924 to the received sideband signal (step 1703).

On the other hand, if the device connection status has changed (YES in step 1702), the control unit 921 checks whether or not the device non-mounted state has changed to the device mounted state (step 1704).

If the device mounted state has changed to the device non-mounted state (NO in step 1704), the control unit 921 performs the processing of step 1703. When the device is removed from the device slot 916-*i*, the device connection status changes from the device mounted state to the device non-mounted state.

On the other hand, if the device non-mounted state has changed to the device mounted state (YES in step 1704), the control unit 921 performs correction parameter update processing (step 1705), and performs the processing of step 1703. When the device is coupled to the device slot 916-*i*, the device connection status changes from the device non-mounted state to the device mounted state.

Figure 13:
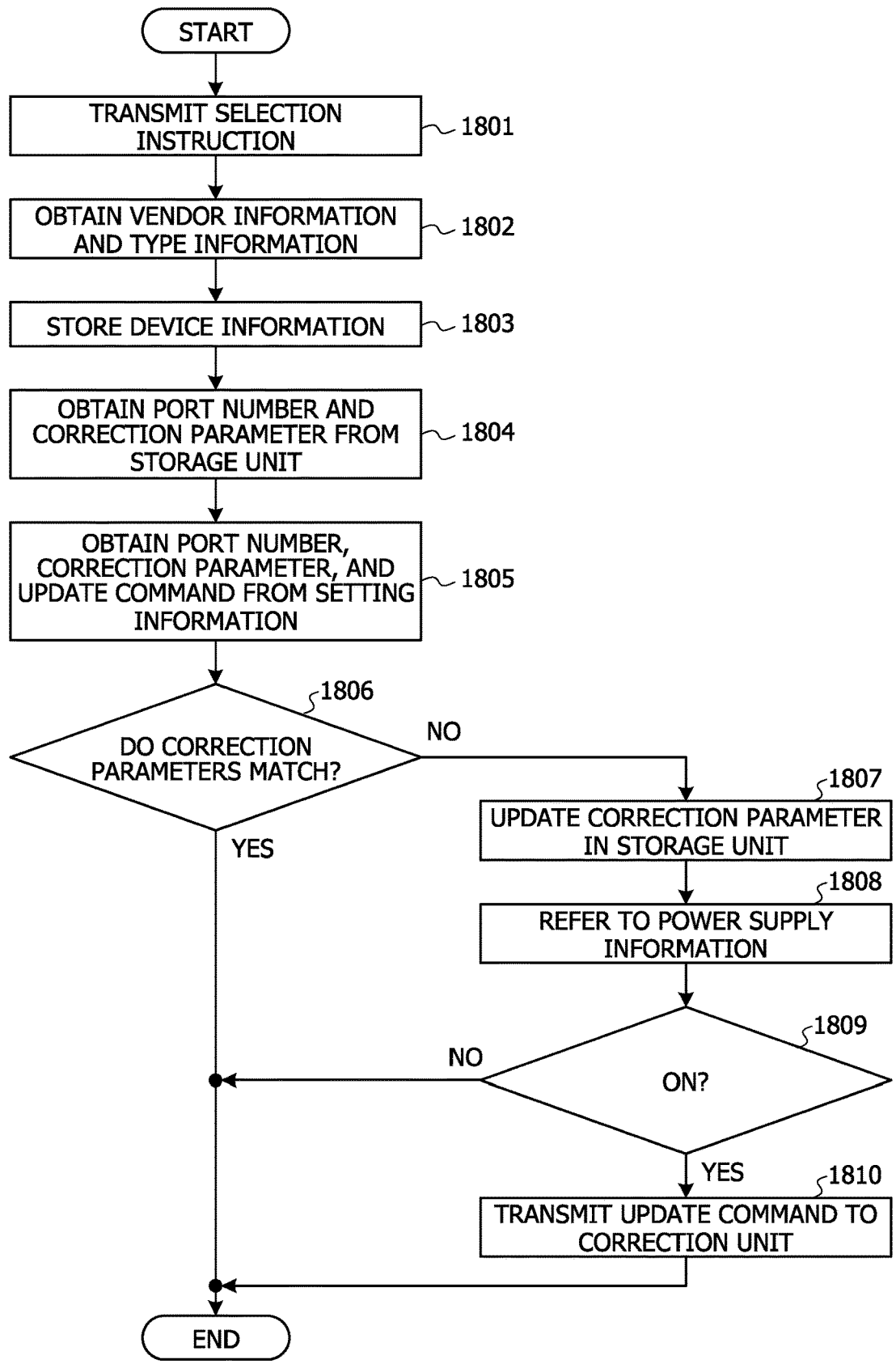
FIG. 13 is a flowchart of a correction parameter update process.

FIG. 13 is a flowchart illustrating exemplary correction parameter update processing in step 1705 in FIG. 12. First, the control unit 921 transmits, to the selection unit 917, a selection instruction indicating the device slot 916-*i* that has changed from the device non-mounted state to the device mounted state via the communication unit 926 (step 1801). The selection unit 917 selects the device slot 916-*i* indicated by the selection instruction received from the control device 911.

Next, the control unit 921 obtains the vendor information and the type information from the device coupled to the selected device slot 916-*i* via the communication unit 926 (step 1802). Then, the control unit 921 stores, in the storage unit 922, the device information including the slot number indicating the selected device slot 916-*i* and the obtained vendor information and type information (step 1803).

Next, the control unit 921 obtains, from the storage unit 915, the port number and the correction parameter via the communication unit 926 (step 1804). Next, the control unit 921 obtains, from the setting information stored in the storage unit 922, the port number, the correction parameter, and the update command corresponding to the slot number, the vendor information, and the type information included in the device information (step 1805).

Then, the control unit 921 compares the correction parameter obtained from the storage unit 915 with the correction parameter obtained from the setting information for each port number obtained from the setting information (step 1806).

If the correction parameter obtained from the storage unit 915 matches the correction parameter obtained from the setting information for each port number (YES in step 1806), the control unit 921 ends the process.

On the other hand, if the correction parameter obtained from the storage unit 915 does not match the correction parameter obtained from the setting information for one or a plurality of port numbers obtained from the setting information (NO in step 1806), the control unit 921 performs processing of step 1807. In step 1807, the control unit 921 updates the correction parameter associated with each port number obtained from the setting information in the storage unit 915 to the correction parameter obtained from the setting information via the communication unit 926.

Next, the control unit 921 refers to the power supply information stored in the storage unit 922 (step 1808) to check whether the normal power supply P2 is ON or OFF (step 1809). If the normal power supply P2 is OFF (NO in step 1809), the control unit 921 ends the process.

On the other hand, if the normal power supply P2 is ON (YES in step 1809), the control unit 921 transmits, to the correction unit 914, the update command obtained from the setting information via the communication unit 926 (step 1810). As a result, the control unit 921 updates the correction parameter set in association with each port number corresponding to the slot number in the device information in the correction unit 914 to the correction parameter included in the update command.

Figure 14:
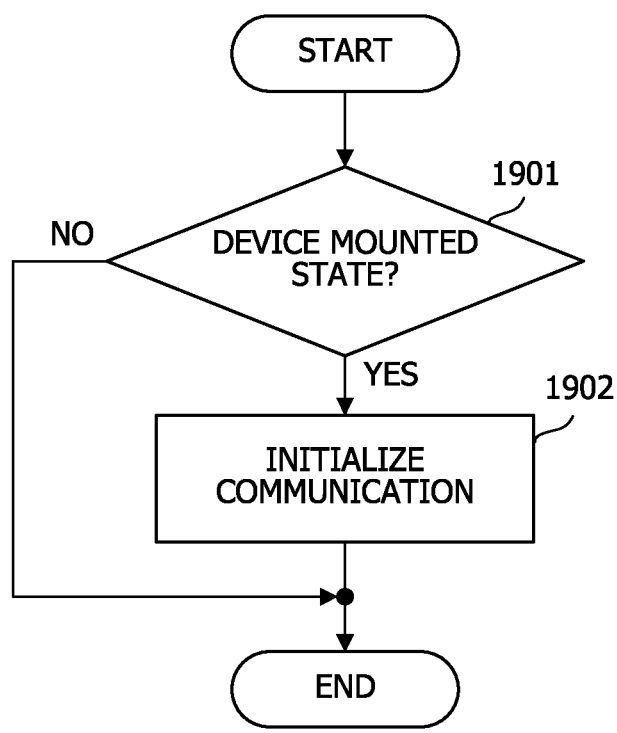
FIG. 14 is a flowchart of a communication initialization process.

FIG. 14 is a flowchart illustrating an exemplary communication initialization process to be performed by the arithmetic processing unit 933 in FIG. 4. When the normal power supply P2 is turned ON, the arithmetic processing unit 933 performs the communication initialization process in FIG. 14.

First, the arithmetic processing unit 933 refers to the sideband signal of each of the device slots 916-*i* received from the control device 911 to check whether or not the device connection status is the device mounted state (step 1901).

If the device connection status is the device mounted state (YES in step 1901), the arithmetic processing unit 933 initializes the communication with the device coupled to the device slot 916-*i* via the communication unit 934 (step 1902). As a result, the device incorporation is carried out, and high-speed communication between the arithmetic processing unit 933 and the device becomes available.

If the device connection status is the device non-mounted state (NO in step 1901), the arithmetic processing unit 933 ends the process.

When the communication initialization process in FIG. 14 is terminated, an operating system (OS) starts, and the arithmetic processing unit 933 starts various types of information processing using the storage unit 935.

Figure 15:
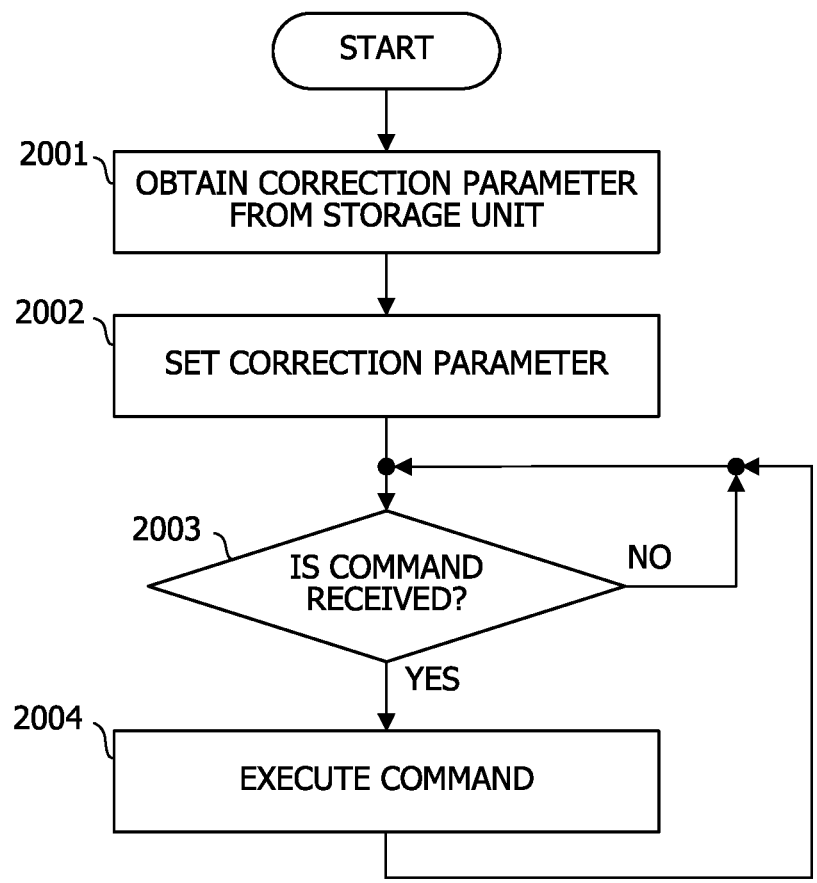
FIG. 15 is a flowchart of a correction parameter setting process.

FIG. 15 is a flowchart illustrating an exemplary correction parameter setting process to be performed by the correction unit 914 in FIG. 4. The correction unit 914 performs the correction parameter setting process in FIG. 15 when the normal power supply P2 is turned ON.

First, the correction unit 914 obtains, from the storage unit 915, the correction parameter corresponding to each port number through the communication path 943 (step 2001). Then, the correction unit 914 sets the obtained correction parameter as a correction parameter corresponding to the port indicated by the port number (step 2002).

Next, the correction unit 914 checks whether or not a command is received from the control device 911 (step 2003). The control device 911 transmits, to the correction unit 914, either an update command or a read command, for example.

If the command is received (YES in step 2003), the correction unit 914 executes the received command (step 2004), and repeats the process of step 2003 and subsequent steps. On the other hand, if no command is received (NO in step 2003), the correction unit 914 repeats the process of step 2003 and subsequent steps.

Figure 16:
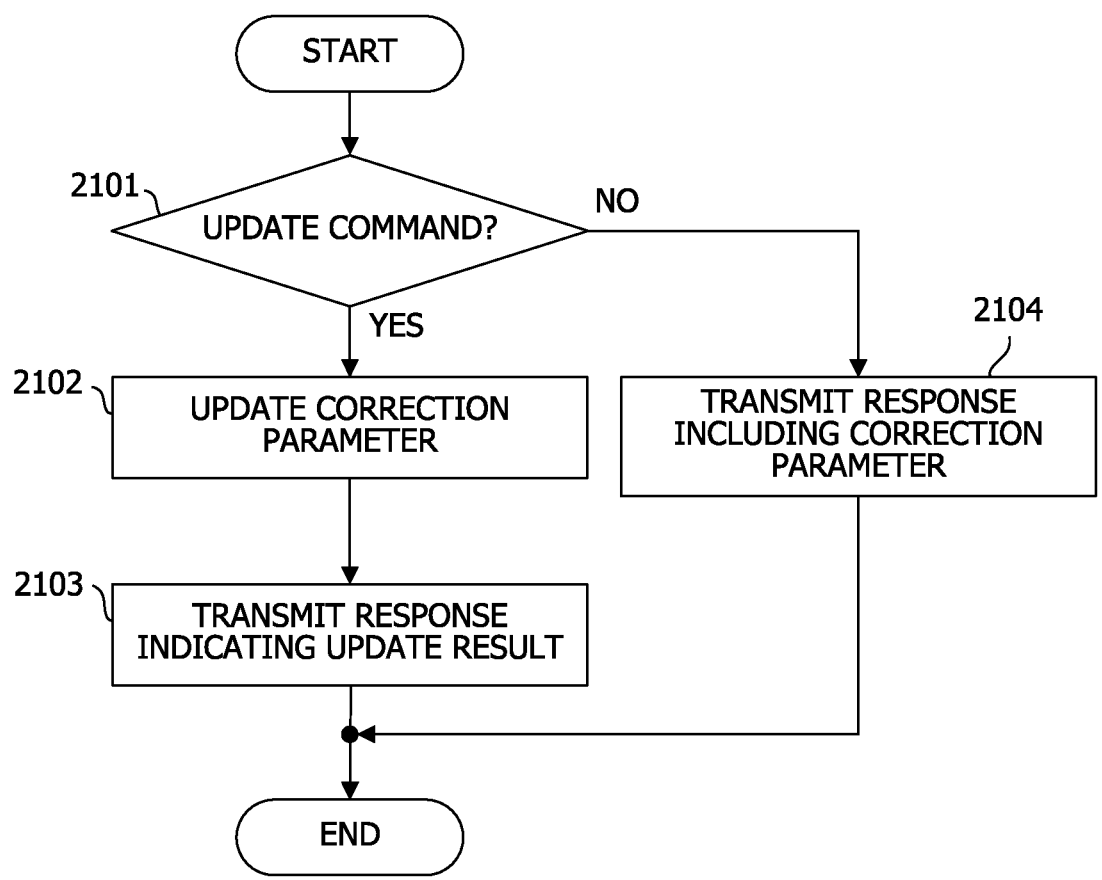
FIG. 16 is a flowchart of a command execution process.

FIG. 16 is a flowchart illustrating an exemplary command execution process in step 2004 in FIG. 15. First, the correction unit 914 checks whether or not the received command is an update command (step 2101).

If the received command is an update command (YES in step 2101), the correction unit 914 updates the correction parameter set to the port indicated by the port number included in the update command to the correction parameter included in the update command (step 2102). Then, the correction unit 914 transmits a response indicating the update result to the control device 911 (step 2103).

On the other hand, if the received command is a read command (NO in step 2101), the correction unit 914 transmits, to the control device 911, a response including the correction parameter set to the port indicated by the port number included in the read command (step 2104).

Figure 17:
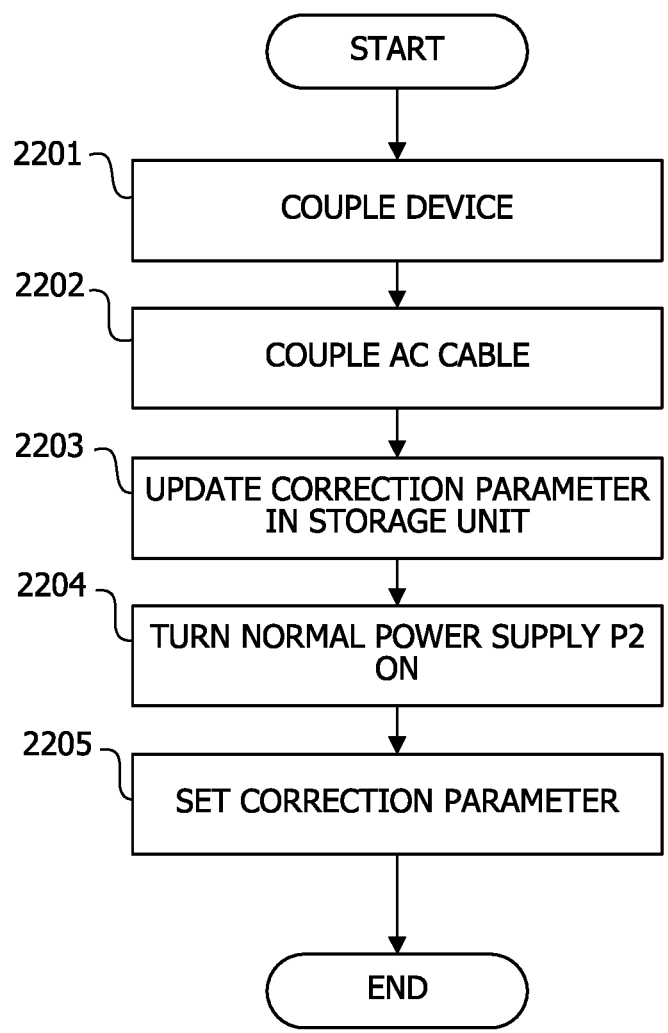
FIG. 17 is a flowchart of a first operation.

FIG. 17 is a flowchart illustrating an exemplary first operation when a device is coupled to the device slot 916-*i* before the power of the permanent power supply P1 is supplied to the information processing device 901 in FIG. 4.

First, the user couples the device to any of the device slots 916-*i* (step 2201), and couples an AC cable to the information processing device 901 (step 2202). As a result, the power of the permanent power supply P1 is supplied to the control device 911, the storage unit 915, and the device.

The control unit 921 performs the control process in FIG. 10, and performs the correction parameter update processing in step 1705 in FIG. 12. Then, the control unit 921 updates the correction parameter associated with each port number obtained from the setting information in the storage unit 915 to the correction parameter obtained from the setting information in step 1807 in FIG. 13 (step 2203). In this case, the normal power supply P2 is OFF, and thus the processing of step 1810 is skipped.

Next, the user transmits a power supply control instruction for turning the normal power supply P2 ON to the control device 911 (step 2204). In step 1605 in FIG. 11, the control unit 921 transmits a control signal indicating ON to the power supply control unit 913, and in step 1403 in FIG. 9, the power supply control unit 913 switches the normal power supply P2 from OFF to ON. As a result, the power of the normal power supply P2 is supplied to the host unit 912, the correction unit 914, and the device.

The correction unit 914 performs the correction parameter setting process in FIG. 15, and in step 2002, it sets the correction parameter corresponding to each port number obtained from the storage unit 915 as a correction parameter corresponding to the port indicated by the port number (step 2205). As a result, the correction parameter for the device coupled to the device slot 916-*i* is set in the correction unit 914.

Next, the arithmetic processing unit 933 performs the communication initialization process in FIG. 14. Since the correction parameter suitable for the device is set in the correction unit 914, upon completion of the communication initialization process, the link-up of the device succeeds, and the high-speed communication between the arithmetic processing unit 933 and the device becomes available. Therefore, the information processing device 901 is enabled to perform information processing using the coupled device.

Meanwhile, at a time of active replacement of the device, the device is removed from the device slot 916-*i* and another device is coupled to the device slot 916-*i* while the power of the permanent power supply P1 is being supplied.

Figure 18:
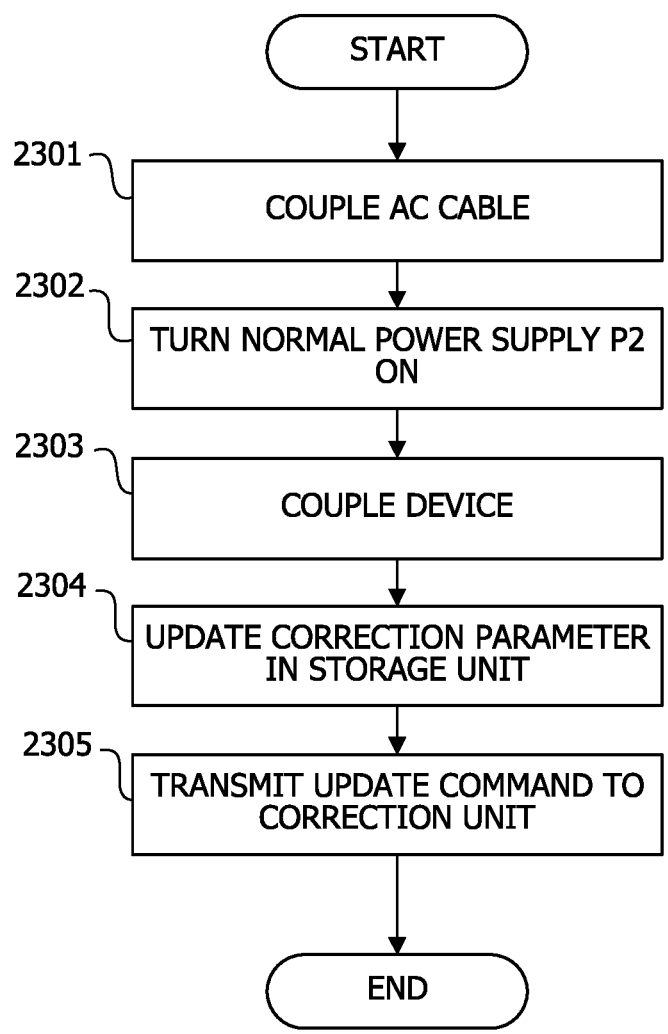
FIG. 18 is a flowchart of a second operation.

FIG. 18 is a flowchart illustrating an exemplary second operation when a device is coupled to the device slot 916-*i* while the power of the permanent power supply P1 is being supplied to the information processing device 901 in FIG. 4.

First, the user couples an AC cable to the information processing device 901 (step 2301). As a result, the power of the permanent power supply P1 is supplied to the control device 911, the storage unit 915, and the device.

Next, the user transmits a power supply control instruction for turning the normal power supply P2 ON to the control device 911 (step 2302). The control unit 921 performs the control process in FIG. 10, and transmits a control signal indicating ON to the power supply control unit 913 in step 1605 in FIG. 11, and the power supply control unit 913 switches the normal power supply P2 from OFF to ON in step 1403 in FIG. 9. As a result, the power of the normal power supply P2 is supplied to the host unit 912, the correction unit 914, and the device.

The correction unit 914 performs the correction parameter setting process in FIG. 15, and in step 2002, it sets the correction parameter corresponding to each port number obtained from the storage unit 915 as a correction parameter corresponding to the port indicated by the port number.

Next, the user couples the device to any of the device slots 916-*i* (step 2303). After removing the device from any of the device slots 916-*i*, the user may couple another device to that device slot 916-*i*.

The control unit 921 performs the correction parameter update processing in step 1705 in FIG. 12. Then, the control unit 921 updates the correction parameter associated with each port number obtained from the setting information in the storage unit 915 to the correction parameter obtained from the setting information in step 1807 in FIG. 13 (step 2304).

In this case, since the normal power supply P2 is ON, the control unit 921 transmits the update command obtained from the setting information to the correction unit 914 in step 1810 (step 2305). Then, in step 2102 in FIG. 16, the correction unit 914 updates the correction parameter set to the port indicated by the port number included in the update command to the correction parameter included in the update command. As a result, the correction parameter for the device coupled to the device slot 916-*i* is set in the correction unit 914.

Next, the arithmetic processing unit 933 performs the communication initialization process in FIG. 14. Since the correction parameter suitable for the device is set in the correction unit 914, upon completion of the communication initialization process, the link-up of the device succeeds, and the high-speed communication between the arithmetic processing unit 933 and the device becomes available.

As described above, the information processing device 901 also supports the active replacement of the device, and the link-up of the device succeeds even when the device is coupled to the device slot 916-$i$ while the power of the permanent power supply P1 is being supplied. Therefore, the information processing device 901 is enabled to perform information processing using the coupled device.

Figure 19:
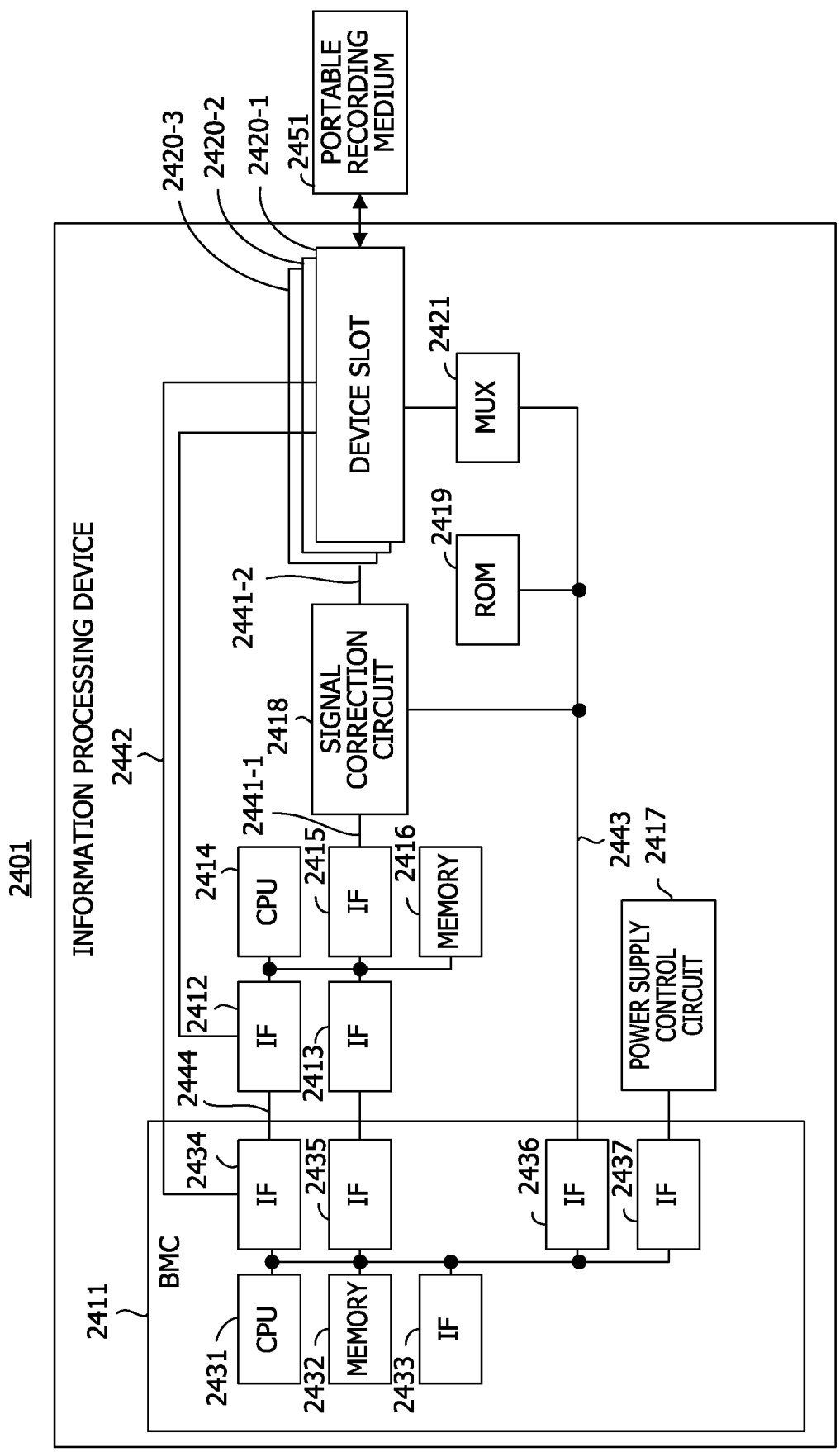
FIG. 19 is a hardware configuration diagram of the information processing device.

FIG. 19 illustrates an exemplary hardware configuration of the information processing device 901 in FIG. 4. An information processing device 2401 in FIG. 19 includes a BMC 2411, an interface (IF) 2412, an IF 2413, a CPU 2414, an IF 2415, and a memory 2416. The information processing device 2401 further includes a power supply control circuit 2417, a signal correction circuit 2418, a ROM 2419, device slots 2420-1 to 2420-3, and a multiplexer (MUX) 2421. Those components are hardware.

The BMC 2411 includes a CPU 2431, a memory 2432, and iFs 2433 to 2437. Those components are hardware. The BMC 2411 operates as the control device 911 in FIG. 4. The CPU 2431, the memory 2432, and the iFs 2433 to 2437 operate as the control unit 921, the storage unit 922, and the communication units 923 to 927 in FIG. 4, respectively.

The IF 2412, the IF 2413, the CPU 2414, the IF 2415, and the memory 2416 operate as the communication unit 931, the communication unit 932, the arithmetic processing unit 933, the communication unit 934, and the storage unit 935 in FIG. 4, respectively. The power supply control circuit 2417, the signal correction circuit 2418, the ROM 2419, and the MUX 2421 operate as the power supply control unit 913, the correction unit 914, the storage unit 915, and the selection unit 917 in FIG. 4, respectively.

The device slots 2420-$i$ ($i$=1 to 3) correspond to the device slots 916-$i$ in FIG. 4. The number of the device slots 2420-$i$ is not limited to three, and may be N (N is an integer of 1 or more).

The IF 2415 communicates with devices coupled to the individual device slots 2420-$i$ through a communication path 2441-1 and a communication path 2441-2 for high-speed communication. The IF 2436 of the BMC 2411 communicates with the signal correction circuit 2418, the ROM 2419, and the MUX 2421 through a communication path 2443 for low-speed communication.

The IF 2434 of the BMC 2411 communicates with the devices coupled to the individual device slots 2420-$i$ through a communication path 2442, and communicates with the IF 2412 through a communication path 2444.

The communication path 2441-1, the communication path 2441-2, the communication path 2442, the communication path 2443, and the communication path 2444 correspond to the communication path 941-1, the communication path 941-2, the communication path 942, the communication path 943, and the communication path 944 in FIG. 4, respectively. (In FIG. 19, connections between the communication paths 2441-2, 2442, etc. and the slot 2420-1 are illustrated, and connections between those communication paths and other slots 2420-2 and 2420-3 are omitted to be illustrated.)

The communication path 2441-1 and the communication path 2441-2 are, for example, communication paths based on PCIe, and the communication path 2443 is, for example, a communication path based on the inter-integrated circuit (I2C). The communication path 2442 and the communication path 2444 are, for example, communication paths for PCIe sideband signals. The IF 2415 is, for example, a PCIe interface, and the IF 2413, the IF 2435, and the IF 2436 are, for example, I2C interfaces. The device slots 2420-$i$ are, for example, PCIe slots.

The memory 2416 and the memory 2432 are semiconductor memories such as a random access memory (RAM). The ROM 2419 may be an Electrically Erasable Programmable Read-Only Memory (EEPROM). The IF 2433 is, for example, a local area network (LAN) interface.

The memory 2416 stores a program X1 and data to be used for information processing. The CPU 2414 operates as the arithmetic processing unit 933 by executing the program X1 using the memory 2416.

The memory 2432 stores a program X2 (firmware) and data to be used for processing of the BMC 2411. The CPU 2431 operates as the control unit 921 by executing the program X2 using the memory 2432.

In a case where the device coupled to the device slot 2420-$i$ is an SSD, the SSD may store the program X1 and the program X2. In this case, the program X1 and the program X2 are loaded from the SSD to the memory 2416 and to the memory 2432, respectively.

In a case where the device coupled to the device slot 2420-$i$ is a medium driving device, the medium driving device drives a portable recording medium 2451 to access the recorded content. The portable recording medium 2451 may store the program X1 and the program X2. In this case, the program X1 and the program X2 are loaded from the portable recording medium 2451 to the memory 2416 and to the memory 2432, respectively.

The portable recording medium 2451 is a memory device, a flexible disk, an optical disk, a magneto-optical disk, or the like. The portable recording medium 2451 may be a compact disk read only memory (CD-ROM), a digital versatile disk (DVD), a universal serial bus (USB) memory, or the like.

As described above, the computer-readable recording medium for storing the program X1 and the program X2 is a physical (non-transitory) recording medium such as the memory 2416, the memory 2432, the SSD, or the portable recording medium 2451.

The configurations of the information processing device 701 in FIG. 2, the information processing device 901 in FIG. 4, and the information processing device 2401 in FIG. 19 are merely examples, and a part of the components may be omitted or modified depending on the use or conditions of the information processing devices.

The configuration of the server 601 in FIG. 1 is merely an example, and a part of the components may be omitted or modified depending on the use or conditions of the server 601.

The flowcharts of FIG. 3 and FIGS. 9 to 18 are merely examples, and a part of the processes may be omitted or modified depending on the configuration or conditions of the information processing devices.

The signal correction data illustrated in FIG. 5, the device information illustrated in FIG. 6, the setting information illustrated in FIG. 7, and the sideband signal illustrated in FIG. 8 are merely examples. The signal correction data, the device information, the setting information, and the sideband signal in another format may be used depending on the configuration or conditions of the information processing device 901.

While the disclosed embodiment and the advantages thereof have been described in detail, those skilled in the art will be able to make various modifications, additions, and omissions without departing from the scope of the embodiment as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a connection circuit to which a first device is coupled;
an arithmetic processing circuit that communicates with the first device coupled to the connection circuit through a first communication path;
a correction circuit configured to correct signal distortion of a signal, wherein the signal distortion is caused by high-speed communication of the signal between the arithmetic processing circuit and the first device in the first communication path based on correction information stored in a correction information storage; and
a control circuit that receives, from a second device, a connection signal that indicates that the second device is coupled to the connection circuit through a second communication path when the second device is coupled to the connection circuit, obtains, from the second device, identification information that indicates the second device through a third communication path based on the connection signal, updates first correction information that is stored in the correction information storage and is used to correct the signal distortion for the first device to second correction information that is used for the second device and is obtained from a correspondence relationship storage using the identification information, and transmits, to the arithmetic processing circuit, an update completion signal through a fourth communication path after the first correction information is updated to the second correction information,
wherein the first communication path includes a communication path between the connection circuit and the arithmetic processing circuit, the second communication path includes a communication path between the connection circuit and the control circuit, the third communication path includes a communication path between the connection circuit and the control circuit, and the fourth communication path includes a communication path between the control circuit and the arithmetic processing circuit,
wherein the control circuit updates the first correction information stored in the correction information storage to the second correction information based on the identification information when power is not supplied to the correction circuit, and
the correction circuit obtains the second correction information from the correction information storage when the power is supplied to the correction circuit.

2. The information processing device according to claim 1, wherein the arithmetic processing circuit starts communication between the arithmetic processing circuit and the first device through the first communication path when the update completion signal is received from the control circuit.

3. The information processing device according to claim 1, wherein when power is supplied to the correction circuit, the control circuit updates the first correction information set in the correction circuit to the second correction information based on the identification information.

4. The information processing device according to claim 1,
wherein the correspondence relationship storage stores the second correction information in association with the identification information,
wherein the control circuit obtains the second correction information from the correspondence relationship storage based on the identification information.

5. A signal correction method to be performed by an information processor including a connection circuit and an arithmetic processing circuit that communicates with a first device coupled to the connection circuit through a first communication path, the method comprising:
receiving, when a second device is coupled, a connection signal that indicates that the second device is coupled to the connection circuit through a second communication path, wherein signal distortion of a signal is caused by high-speed communication of the signal between the arithmetic processing circuit and the first device in the first communication path, and is corrected by a correction circuit based on correction information stored in a correction information storage;
obtaining identification information that indicates the second device through a third communication path based on the connection signal;
updating first correction information that is stored in the correction information storage and is used to correct the signal distortion for the first device to second correction information that is used for the second device and is obtained from a correspondence relationship storage using the identification information;
transmitting an update completion signal to the arithmetic processing circuit through a fourth communication path after the first correction information is updated to the second correction information;
wherein the first communication path includes a communication path between the connection circuit and the arithmetic processing circuit, the second communication path includes a communication path between the connection circuit and a control circuit, the third communication path includes a communication path between the connection circuit and the control circuit, and the fourth communication path includes a communication path between the control circuit and the arithmetic processing circuit;
wherein in the updating;
the first correction information stored in the correction information storage is updated to the second correction information based on the identification information when power is not supplied to the correction circuit, and
the correction circuit obtains the second correction information from the correction information storage when the power is supplied to the correction circuit.

6. The signal correction method according to claim 5, wherein the arithmetic processing circuit starts communication between the arithmetic processing circuit and the first device through the first communication path when the update completion signal is received from the control circuit.

7. The signal correction method according to claim 5, wherein in the updating;
when power is supplied to the correction circuit, the first correction information set in the correction circuit is updated to the second correction information based on the identification information.

8. The signal correction method according to claim 5, further comprising:
obtaining the second correction information from the correspondence relationship storage that stores the second correction information in association with the identification information, based on the identification information.

9. A non-transitory computer-readable recording medium storing a signal correction program causing a processor, that includes a connection circuit and an arithmetic processing circuit that communicates with a first device coupled to the connection circuit through a first communication path, to perform a process comprising:
receiving, when a second device is coupled, a connection signal that indicates that the second device is coupled to the connection circuit through a second communication path, wherein signal distortion of a signal is caused by high-speed communication of the signal between the arithmetic processing circuit and the first device in the first communication path, and is corrected by a correction circuit based on correction information stored in a correction information storage;
obtaining identification information that indicates the second device through a third communication path based on the connection signal;
updating first correction information that is stored in the correction information storage and is used to correct the signal distortion for the first device to second correction information that is used for the second device and is obtained from a correspondence relationship storage using the identification information;
transmitting an update completion signal to the arithmetic processing circuit through a fourth communication path after the first correction information is updated to the second correction information;
wherein the first communication path includes a communication path between the connection circuit and the arithmetic processing circuit, the second communication path includes a communication path between the connection circuit and a control circuit, the third communication path includes a communication path between the connection circuit and the control circuit, and the fourth communication path includes a communication path between the control circuit and the arithmetic processing circuit;
wherein in the updating;
the first correction information stored in the correction information storage is updated to the second correction information based on the identification information when power is not supplied to the correction circuit, and
the correction circuit obtains the second correction information from the correction information storage when the power is supplied to the correction circuit.

10. The recording medium according to claim 9, wherein the arithmetic processing circuit starts communication between the arithmetic processing circuit and the first device through the first communication path when the update completion signal is received from the control circuit.

11. The recording medium according to claim 9, wherein in the updating;
when power is supplied to the correction circuit, the first correction information set in the correction circuit is updated to the second correction information based on the identification information.

12. The recording medium according to claim 9, further comprising:
obtaining the second correction information from the correspondence relationship storage that stores the second correction information in association with the identification information, based on the identification information.

* * * * *